United States Patent

MacMullen

[15] 3,663,935
[45] May 16, 1972

[54] PULSE COMPRESSION CODE SEQUENCING SYSTEM

[72] Inventor: Alexander MacMullen, Palos Verdes, Calif.

[73] Assignee: Hughes Aircraft Company, Culver City, Calif.

[22] Filed: June 5, 1967

[21] Appl. No.: 643,514

[52] U.S. Cl. .............................343/17.2 R, 178/22, 325/34, 325/122, 343/17.2 PC
[51] Int. Cl. .......................................................G01s g/233
[58] Field of Search....................343/17.2, 14, 6.5, 17.5, 6.8, 343/18 E; 325/32–35, 122; 178/22, 99

[56] References Cited

UNITED STATES PATENTS

| | | | |
|---|---|---|---|
| 2,410,276 | 10/1946 | Eilenberger | 325/34 |
| 3,366,955 | 1/1968 | Mattern | 343/17.2 |

*Primary Examiner*—Malcolm F. Hubler
*Attorney*—W. H. MacAllister, Jr. and George Jameson

[57] ABSTRACT

A pulse recognition coding and decoding system for use in a binary phase coded high resolution radar, wherein a transmitter of a high resolution radar is modulated with different codes at successive pulse repetition periods. By selection of predetermined codes which are alternately coded, transmitted, received and decoded, a wide pulse is transmitted and then compressed. The codes are provided by alternate selection of portions of a tapped delay line wherein the selected coded pulses are presented to the transmitter. On receive, the same delay lines are used to present the alternate codes to a memory device. The selected codes are alternately applied to a memory device where they are combined. The memory device performs the averaging process, suppressing the sidelobes and adding at the main lobes in the well known manner.

13 Claims, 7 Drawing Figures

PULSE COMPRESSION CODE SEQUENCING SYSTEM

BACKGROUND OF THE INVENTION

This invention relates to a novel and improved apparatus for the transmission and reception of signals and more particularly to a radar system which embodies pulse coding of the transmitted signals to achieve high range resolution by providing a system using the principle of code sequencing and which is thereby capable of producing improved radar imagery.

As is known, long-range detection of radar targets requires the use of high power radars and, hence, the use of transmitted pulses having large energy content. Such a requirement usually involves high peak powers and large pulsewidths. However, if large pulsewidths are used, the range accuracy and resolution of the radar system generally deteriorates. The range resolution and range accuracy of a radar is inversely proportional to the spectral bandwidth of the transmitted waveform. One way to achieve a large spectral bandwidth is to code the pulse of a radar system into a sequence of a plurality of contiguous code pulses of the same frequency and of a preselected code, the bandwidth of the resulting waveform, in cycles per second, being the reciprocal of the code pulse duration. Hence, the time-bandwidth product is then equal to a number of code pulses.

In accordance with this invention, a waveform is composed of a series of discrete subpulses, each successive one of which has a phase which differs from the preceding subpulse by a fixed amount, so that the phase versus time plot of the waveform appears substantially in the shape of a binary code. Alternate waveforms are composed of differing but related unique codes. The system may be constructed to use codes of any one of many values of subpulses or bits.

Prior art radar system codes or divides the transmitted pulse waveform into a relatively large number of subpulses in order to achieve a large time-bandwidth product and to decode or reprocess these pulses during a receiving mode in order to achieve high resolution and reduced ambiguous subpulse by-products of the pulse compression. Such a system is made possible by the generation of a particular waveform for the transmitted signal and the subsequent processing of the received signal.

This invention provides an improvement in the prior art pulse compression system used with radar mapping systems, for example, which has an increased dynamic range and a reduced level of false images provided by reducing the peak and average spectral sidelobe power. This is accomplished by using a code sequencing operation wherein the transmitter of the high resolution radar is modulated with different codes at successive pulse repetition periods.

SUMMARY OF THE INVENTION

Briefly described, the present invention provides a novel and improved pulse recognition coding and decoding system for use in a binary phase coded high resolution radar, or the like, and wherein the transmitter of the high resolution radar is modulated with different codes at successive pulse repetition periods. By selection of predetermined codes which are alternately coded, transmitted, received and decoded, a wide pulse is transmitted and then compressed wherein the average value of the compressed pulses exhibits little or no sidelobes and thus reduces or diminishes false images on display maps or the like. This is accomplished by alternating a given code with another code on successive transmitter pulses. The codes used in this type of system are those found, for example, in the article "Group Synchronizing of Binary Digital Systems" by R. H. Barker, published in Communication Theory, London, 1953, pages 273-287.

Two codes or a plurality of codes in a cyclic repetitive sequence may be used. Generally, the codes selected contain the same number of bits or subpulses. However, the codes should have some family relationship. For purposes of illustration, three code pair relationships and systems for their implementation will be described. One embodiment of this invention used two codes of the same length, one of which is a permutation of the other by a cyclic process of a few bits. The second embodiment is similar to the first except it uses two codes which are cyclic permutations of the other by approximately one-half the number of code bits. The third code pair relationship alternates a given code with itself transposed by changing the polarity of even bits. This last technique changes the polarity of every other sidelobe (even sidelobes) in the compressed pulse without affecting the mainlobe, the mainlobe always being an odd lobe.

The two codes are provided by alternate selection of portions of a tapped delay line wherein the selected coded pulses are presented to the transmitter. On receive, the same delay lines are used to present the alternate codes to a memory device. The codes selected for this invention may be of one of several types of codes appropriate for pulse compression. The selected codes are alternately applied to a memory device where they are combined. The memory device performs the averaging process, suppressing the sidelobes and adding at the mainlobes in the well known manner.

It therefore becomes one object of this invention to provide a novel and improved pulse compression code sequencing system.

Another object of this invention is to provide a novel and improved pulse compression code sequencing system with reduced sidelobe peak amplitudes.

Another object of this invention is to provide a novel and improved code sequencing operation used in high resolution radar mapping systems or the like.

Another object of this invention is to provide a novel and improved code sequencing system that is relatively simple with relation to the improvement provided thereby.

Another object of this invention is to provide a novel and improved pulse compression system useful with high resolution radar mapping systems with an improved quality of radar imagery by reducing false images which may appear on the map and the dynamic range of the map.

These and other objects will become apparent to those skilled in the art when taken into consideration with the following detailed description and in connection with the attached drawings wherein like reference numerals indicate like or corresponding parts throughout the several views and wherein:

Figure 1:
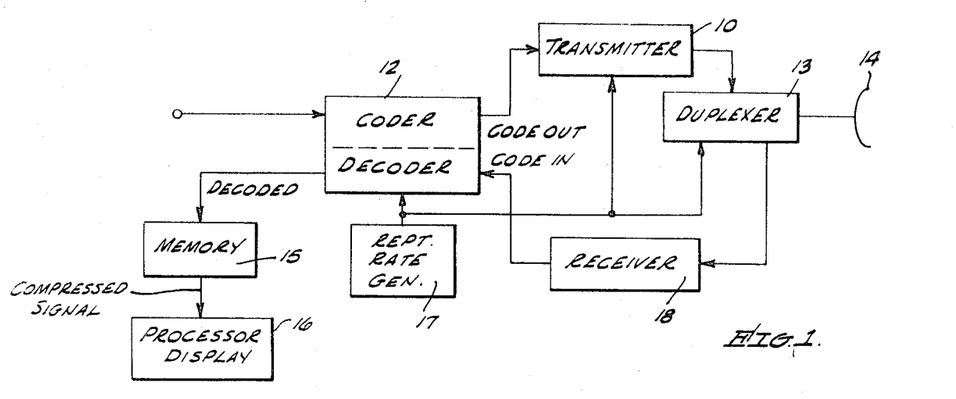
FIG. 1 is a block diagram illustrating partial components of a radar system used with this invention.

Turning now to a more detailed description of this invention, there is shown in FIG. 1 a partial radar system which is used to encompass this invention, wherein the numeral 10 indicates a radar transmitter which is coupled to a coder unit 12. The unmodulated signal applied to coder unit 12 may be similar to the graph A in FIG. 2. The output of coder 12 is a phase modulated signal which is amplified in transmitter 10. Transmitter 10 is coupled to a duplexer 13 which in turn is coupled to a transmit and receive antenna 14.

Coder unit 12 alternately generates codes. A typical example of a pair of codes is depicted in graphs B and C of FIG. 2. Upon receive, the pulse is presented to coder 12 where it is decoded and presented to memory 15, where it is combined with the alternate code or codes, i.e., codeB' is matched with code C', and the resultant signal pulse is produced and presented to a processor display 16. A pulse repetition signal generator 17 is coupled to coder 12 and transmitter 10 and provides overall radar timing and causes switching of the alternate codes B and C.

Figure 3:
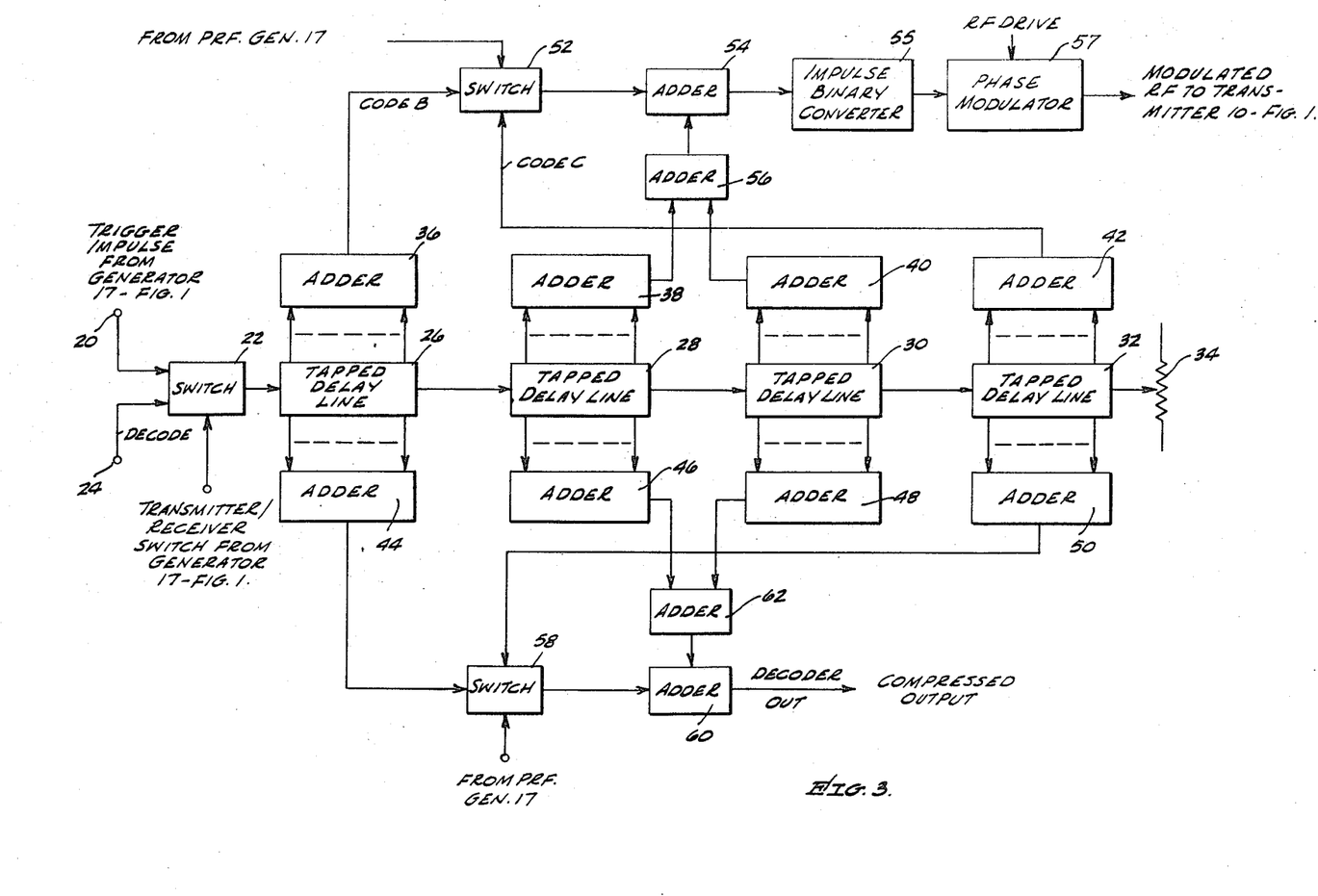
FIG. 3 is a block diagram of one preferred embodiment of this invention.

The embodiment shown in FIG. 3 will produce those two codes, previously mentioned, wherein one is a permutation of the other by a cyclic process of a few bits. Examples of these two codes are as follows:

Code 1: ─+─+─────+─+────+───+─+─+─+
Code 2: +─+─+─+───+─+───────+─+───+─

From these codes it is apparent that Code 2 can be formed by using the last four bits of code 1 as the first four bits of Code 2, and then adding the remaining bits of Code 1 in sequence to the first four bits of Code 2. The codes (1 and 2) to be transmitted are formed in the following manner: a trigger impulse from generator 17 is applied to terminal 20 and through switch 22, which is operated to either generate the code on transmit or decode the input to coder unit 12 and is accomplished in synchronism with transmitter 10 and duplexer 13 as shown in FIG. 1. The impulse signal, applied to terminal 20, will form the signal to be coded and transmitted from the radar system, and the signal applied to terminal 24 is the received signal which is to be decoded and ultimately sent to display devices to be explained herein.

On transmit, code impulse 20 is applied through switch 22 to tapped delay lines 26, 28, 30 and 32 and terminated by a dummy load 34. An amplifier (not shown) may be inserted between each adjacent pair of tapped delay lines to compensate for delay line losses. Each delay line 26, 28, 30 and 32 has a plurality of taps at different delayed intervals. As the impulse travels down the line, it passes each tap, at which a portion of the impulse is coupled out and sent to respective adders 36, 38, 40 and 42 on the coder side coder unit 12.

Adders 36 and 42 are connected to a code alternating switch 52 which in turn is coupled to adder 54. Switch 52 may be operated by the PRF rate generator 17. Adders 38 and 40 are coupled to adder 56 which in turn is coupled to adder 54. The output of adder 54 is a train of impulses representing the transition times of the code. Converter 55 can change the train of impulses into a two voltage level binary code, or even three or four voltage levels, and modulator 57 changes the phase of the RF drive signal which is fed to transmitter 10 for amplification and in turn radiated through antenna 14.

In operation of the present invention, an impulse signal is applied to switch 22 which has previously been switched to transmit from terminal 20. The impulse signal is then shifted down delay lines 26, 28, 30 and 32 into the dummy load 34. At the specified delay times, the impulses appearing at the taps are summed in their appropriate adders 36, 38, 40 and 42. If switch 52 is switched to allow the output of adder 36 to enter adder 54, the output of adder 42 will not be fed into adder 54 but only the outputs of adders 36, 38 and 40. One of the codes to be transmitted is formed by this sequence. On the next alternate impulse applied to terminal 20, switch 52 then allows the output of adder 42 to be applied to adder 54. Then the outputs of 38 and 40 are added in 56 and the sum thereof is consequently added to the output of adder 42 in adder 54.

Thus, the alternate code is transmitted. The received signals are sequentially applied to decoder input terminal 24. Switch 22 has been switched to receive this input into the tapped delay lines 26, 28, 30 and 32. The outputs of these tapped delay lines are applied to adders 44, 46, 48 and 50, similar to the coding operation. Switch 58 operates in synchronism with switch 52 by command from the PRF rate generator 17, and alternately sums either the outputs of adders 44, 46 and 48, or the output of adders 46, 48 and 50 compressing the alternate received codes in synchronism.

Figure 5:
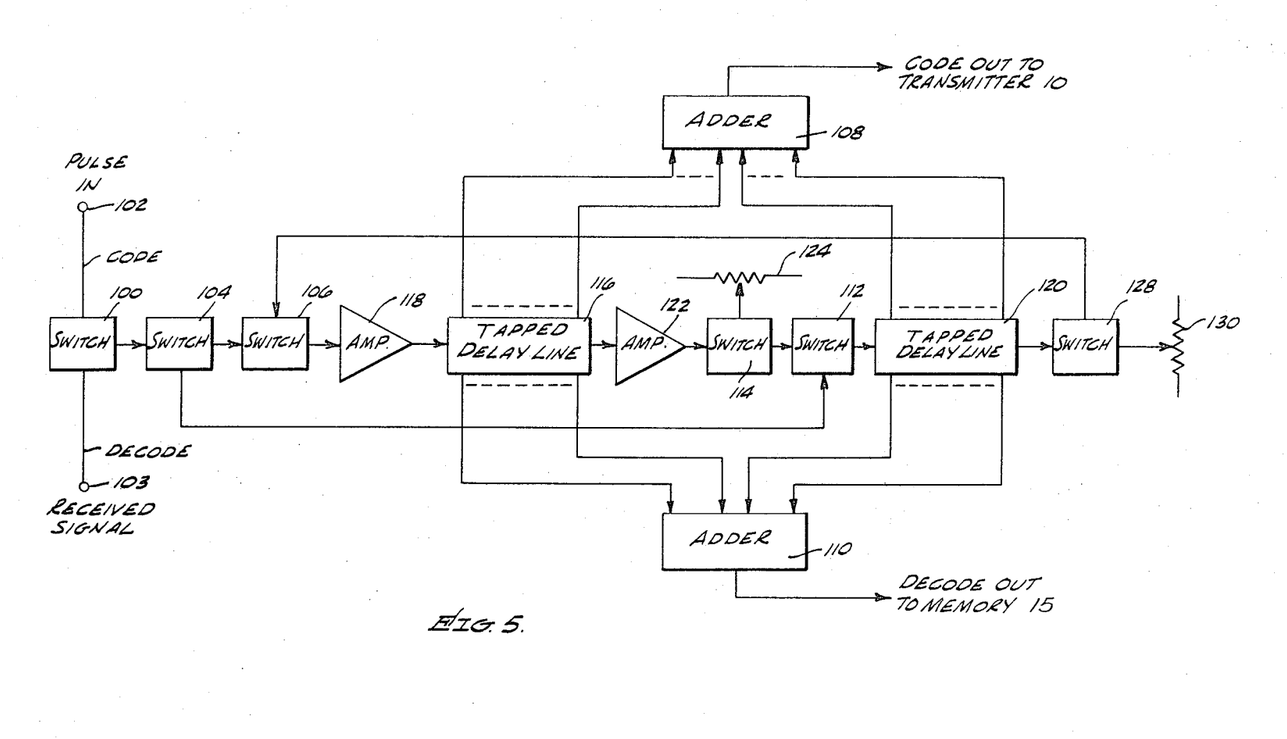
FIG. 5 is a block diagram of a second embodiment of this invention.

A second embodiment of this invention is shown in FIG. 5, and is typical of use when the codes are related by cyclic permutations of approximately half a code length.

Examples of codes with this relationship are as follows:

Code 3: ─+─+───────+─+──+────+─+─+─+
Code 4: +─+───+───+─+─+─+──+─+───────

Figure 2:
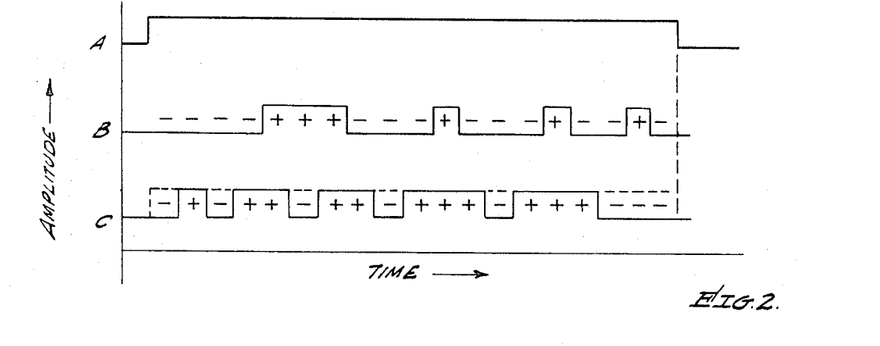
FIG. 2 is a graphic illustration of the pulse codes used with this invention.

Examination of code 4 reveals that it can be formed by using the last 11 bits of Code 3 as its first 11 bits and then adding in sequence thereto the first eight bits of Code 3. In the embodiment shown in FIG. 5 a switching device 100, similar to the switching device 22 of FIG. 2, is operated in synchronism with the duplexer 13 as shown in FIG. 1, wherein the pulse is first coded by the transmit section of the coder unit 12 and presented for transmission, and the received signal is decoded through the decode section, phase detected, and presented to the memory for comparison with alternate codes. Switch 100 has two input terminals; input terminal 102 for receiving the input pulse and input terminal 103 for receiving the signal that has been previously transmitted and received by antenna 14, as shown in FIG. 1. The output of switch 100 is coupled as an input to a switch 104 and the output therefrom is coupled as an input into switch 106. Switches 104, 106, 112, 114 and a switch 128 are operated alternately by the pulse repetition frequency (PRF) rate generator 17 as shown in FIG. 1. A first pulse is applied to the pulse input terminal 102 through switch 100 and through switch 104 to switch 106 or switch 112, depending upon the condition of switch 104, and thereafter the pulse is applied to a tapped delay line 116 through the amplifier 118 or to a tapped delay line 120. If, for example, the first code is applied to tapped delay line 116 and through amplifier 122 to switch 114, it will either at this time be applied to switch 112 or to a dummy load 124. If it is allowed to continue through tapped delay line 120 and switch 128 is activated, it is dissipated by dummy load 130, the outputs of both tapped delay lines 116 and 120 are applied to adder 108 and thereafter the coded pulse is transmitted via antenna 14 (FIG. 1). A second code is applied and switches 104, 106, 114 and 128 are reversed by the PRF generator 17. The input signal is first applied to switch 112 to the tapped delay line 120 and through switch 128 back into switch 116 which reverses the code of the pulse to be transmitted and sends out the second or transposed code to the adder 108.

On receive through input terminal 103 from the antenna 14, switches 104, 106, 112 and 128 operate in the same manner so that the appropriate coded signals are applied to the adder at the respective times, and presents the decoded output to the memory 15.

Figure 5A:
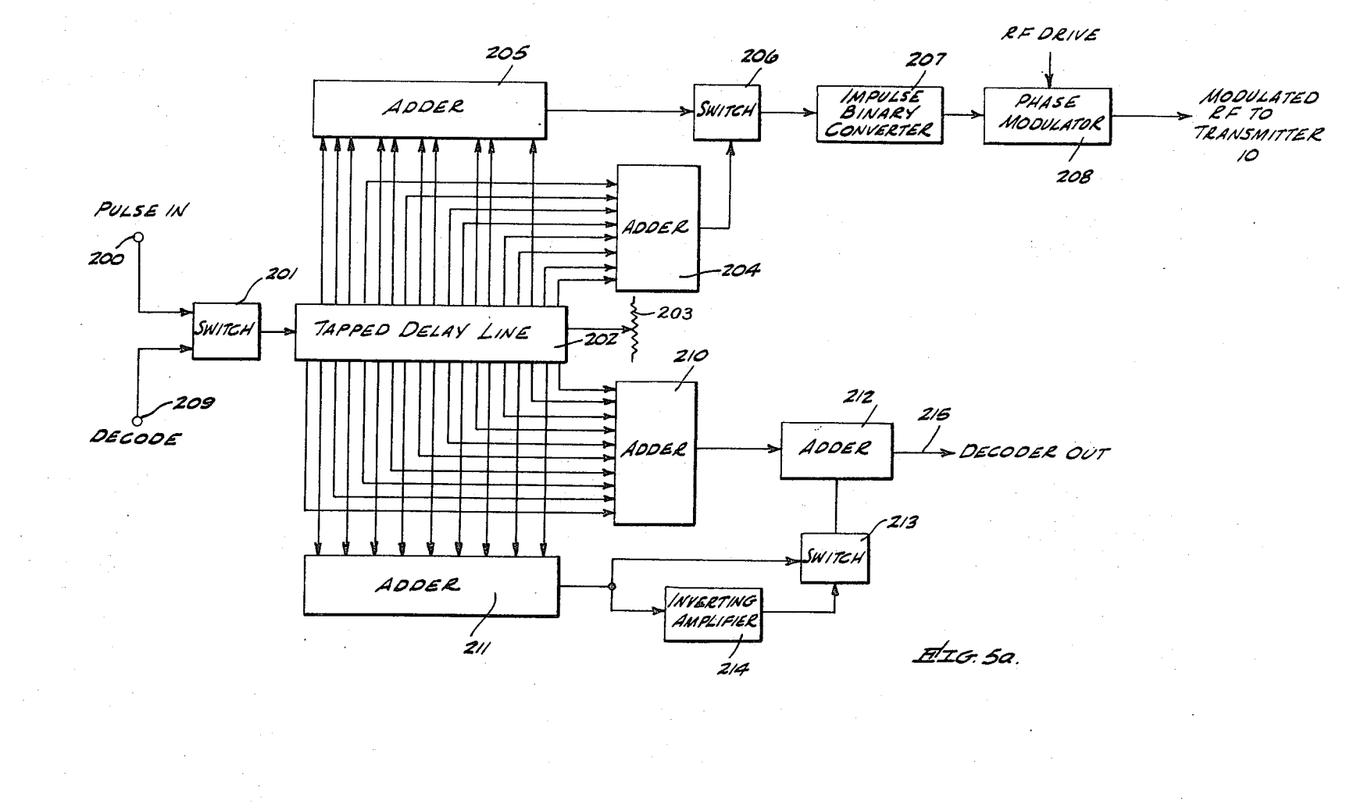
FIG. 5a is a block diagram of a third embodiment of this invention.

A third embodiment of this invention is shown in FIG. 5a. The third code pair relationship, previously mentioned, is generated in this third embodiment by alternating a given code with itself transposed by changing the polarity of the even bits. An example of this coding relationship is given by the following codes:

Code B: ──────+─+─+──────+────+────+──
Code C: ─+─+─+─+─+─+─+─+─+─+─+───────

Upon examination of these codes, it is apparent that the odd numbered bits of Code C are identical to the respective odd numbered bits of Code B, whereas the polarities of the even bits of Code C differ from the polarities of the respective even bits of Code B. Codes B and C are respectively illustrated in the graphs B and C of FIG. 2.

Figure 4:
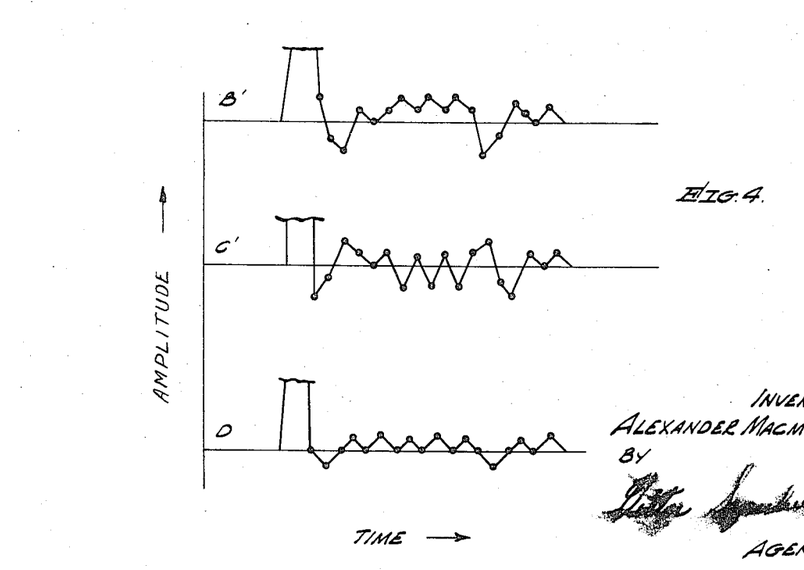
FIG. 4 is a graphic illustration of typical waveforms of the compressed pulse patterns (autocorrelations) of the alternate codes after being transmitted and received and the resultant pulse pattern from the comparison thereof.

In the embodiment of FIG. 5a, on transmit, a trigger impulse from transmitter 10 is applied to an input terminal 200 and to a switch 201, whose position is controlled by a timing signal from generator 17. The impulse passes through switch 201, traverses tapped delay line 202, and is terminated in a dummy load 203. Trains of appropriately delayed impulses are formed by summation of the signals appearing at coder taps by adders 204 and 205. Adder 204 forms code B and adder 205 forms code C which is identical to B except that the polarity of all even bits has been reversed. Code B or code C is selected for transmission on alternate transmitter pulses by switch 206. The code sequence is changed from a train of impulses into a binary waveform by converter 207. The output of converter 207 phase modulates the RF drive to transmitter 10 in modulator 208. On receive, the target returns picked up by antenna 14 and amplified by receiver 18 enter the decoder at terminal 209, pass through switch 201 and traverse tapped delay line 202 to load 203. Alternate decoder taps are connected to adders 210 and 211. The output of adder 210 is connected directly to one input of adder 212.

The output of adder 211 is connected to the other input of adder 212 either directly through switch 213 or alternately through inverting amplifier 214 and switch 213. Switches 201, 206 and 213 operate in synchronism, transferring from code B to code C on alternate transmitter pulses. Output signal 215 is a compressed or decoded pulse pattern and appears as B' and C' of FIG. 4. Signal 215 is sent to the memory device 15 via the phase detector (not shown) which averages compressed pulses B' and C'. Waveforms B' and C' of FIG. 4 illustrate the alternately received codes (that were transmitted by the embodiment of FIG. 5a which will be subsequently explained) as applied to the memory 15 after compression and phase detection. For illustrative purposes, representative numbers, corresponding to the relative indicated amplitudes, may be assigned to the indicated points on each waveform as follows:

| | Main lobe | Remaining waveform points on one side lobe | | | | | | | | | | | | | |
|---|---|---|---|---|---|---|---|---|---|---|---|---|---|---|---|
| Waveform B' | +19 | +2 | −1 | −2 | +1.0 | +1 | +2 | +1 | +2 | +1 | +2 | +1 | −2 | −1 | +2 | +1.0 | +1 |
| Waveform C' | +19 | −2 | −1 | +2 | +1.0 | +1 | −2 | +1 | −2 | +1 | −2 | +1 | +2 | −1 | −2 | +1.0 | +1 |

The other sidelobe of each waveform will be identical in point value to the corresponding illustrated sidelobe and are therefore not shown. The average value of the corresponding points in waveforms B' and C' will be read out from the memory device 15, thereby producing the following point values in the resultant waveform D of FIG. 4:

Waveform D: +19,0, −1,0,+1,0,+1,0,+1,0,+1,0,+1,0,−1,0,+1,0,+1

It is therefore apparent that the signal waveform D (FIG. 4) has much lower sidelobe levels than either B' or C' above.

Figure 6:
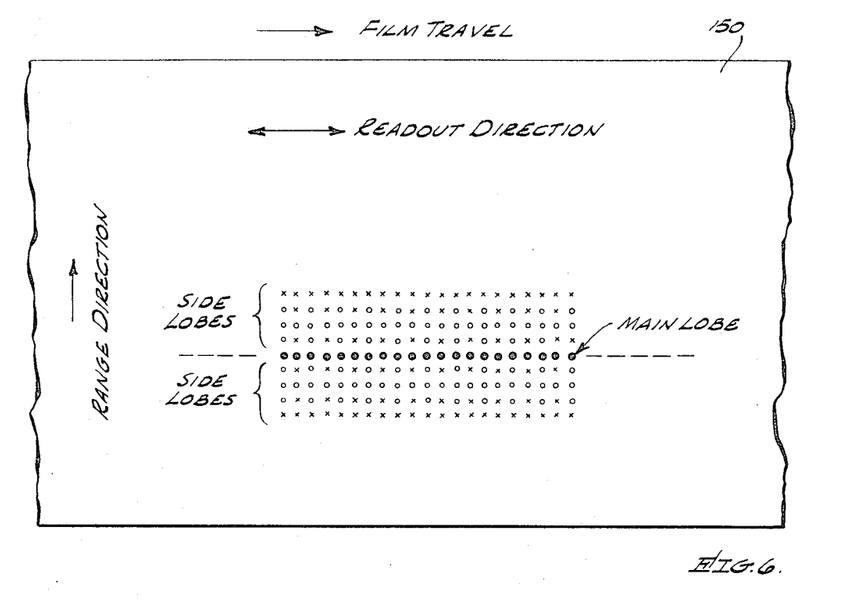
FIG. 6 is a typical film display as used as a memory device.

Referring now to FIG. 6, there is depicted one type of the memory device 15 of FIG. 1 for comparing the received alternate codes and for applying the alternate sidelobes for cancellation. The large solid circles represent the mainlobes which produce large black dots, the small open circles represent light spots, and the small x's represent gray spots. The even vertical rows of symbols represent one code while the odd vertical rows of symbols represent the other or alternate code. Upon readout from the memory 15 the average values of the vertical rows will be presented to the processor display 16. Such decoding devices for displaying raw data are well known in the art and to conserve space will not be explained herein. A film strip 150 travels in a predetermined direction. The decoded target returns are recorded on film strip 150. Near range is located at one edge of the film and far range is located at the other edge. As the film moves, returns from successive pulses are placed side by side in the well known manner. After film processing, the recorded data is read out in a transverse direction as indicated in FIG. 6 wherein the mainlobe is located as the center of the exposures on film strip 150. By the density of the exposed film of raw data, darkness indicates peak positive amplitudes of the received targets and the exposure is graying to light as the amplitude decreases and becomes negative.

The different codes transmitted on successive cycles produce identical mainlobe phase and amplitudes. However, the sidelobe phases and amplitudes appearing on successive codes will differ, and the average of some of the sidelobes will be reduced greatly from the sidelobes of either B' or C' alone. Thus, in accordance with this invention, if two codes (B and C of FIG. 2) are transmitted on alternate pulses, the pulse patterns of waveforms B' and C' of FIG. 4 will result from the pulse compression of the received codes. Upon readout, the average of the sidelobes of the waveforms B' and C' will appear as shown in waveform D of FIG. 4. The major peaks in the sidelobe patterns of the individual codes are cancelled or substantially reduced by the averaging process taking place within memory 15 as depicted on film 150. If, for example, a peak positive sidelobe of one code occurs at a time when the sidelobe of the other code is small or negative, the amplitude of the average would be considerably reduced, as shown in FIG. 6 b.

If the pulse repetition frequency (PRF) is sufficiently high relative to the doppler spectrum, the difference spectrum will not overlap the mainlobe spectrum and will not be seen by pulse processor. In this case a synthetic array doppler processor may be used. If the pulse repetition frequency is reduced and overlap exists, the difference in sidelobes will be seen on the sidelobes of the azimuth pattern as weighted by the system passband. However, the effect of this sidelobe will always be small.

Even in limited cases, a considerable reduction of the different sidelobe power occurs because the weighting of the system attenuates strongly in the region where its amplitude is the greatest. In the first embodiment described (FIG. 3), the two codes selected were cyclic permutations of each other by a few bits. The first code sequence was generated by the code taps between the tapped delay lines 26, 28 and 30 and the second code sequence was generated by the tapped delay lines 28, 30 and 32 as provided by the various switching mechanisms used therewith. The embodiment shown in FIG. 5 was a configuration suitable for sequencing two codes in which one was a permutation of approximately half the length of the other. When the appropriate switches were in one position, a first code was either generated and/or decoded. When the switches were in a second position, a second code was generated and/or decoded. The embodiment shown in FIG. 5A was suitable for sequencing two codes, one with even bits of the other transposed in sign, as illustrated by waveforms B and C in FIG. 2.

It should be noted that because code sequencing reduces peak sidelobe amplitudes and total sidelobe power, it is now possible to reduce or eliminate the sidelobe suppression networks used in present pulse compression systems. Size of the pulse compression system is substantially reduced because the length of the delay lines is reduced and the added circuitry required for code sequencing is very nominal when taking into consideration the reduction of the size of the delay lines.

Having described three preferred embodiments of this invention, I claim:

1. A pulse transmission and receiving system comprising:
   input means for receiving signal pulses to be coded and returned codes to be decoded;
   coding means coupled to said input means for alternately providing a first code and a second code from the signal pulses before the transmission thereof, said coding means comprising a first code portion for providing coded pulses and a second code portion for providing coded pulses differing from the coded pulses of said first code portion, and means for cyclically permuting the coded pulses from said first code portion with the coded pulses of said second code portion in synchronism with the signal pulses in order to produce the first and second codes to be transmitted; and
   decoding means coupled to said input means for alternately decoding the first code and the second code upon reception thereof.

2. The system as defined in claim 1 wherein:
   said decoding means comprises a first decode portion for decoding the coded pulses provided by said first code portion and a second decode portion for decoding the coded pulses provided by said second code portion.

3. In apparatus for transmitting and receiving pulses in a sequential order, comprising:
   pulse coding means including a coding section and a decoding section, first switching means coupled to said pulse coding means for alternately applying the transmitted and received pulses to the coding section and decoding section, respectively, in said pulse coding means, and second switching means coupled to said pulse coding means for providing alternate codes from the pulse from said pulse coding means.

4. The apparatus as defined in claim 3 further comprising a source of pulses to be transmitted, said pulse coding means being coupled to said source of pulses for cyclic permuting the transmitted and received codes in said coding means.

5. The apparatus as defined in claim 4 further including a memory system coupled to said pulse coding means to store the decoded pulses.

6. A pulse sequencing system comprising:

a plurality of series coupled tapped delay lines, each said delay line of said plurality having a plurality of parallel output circuits;

a first adder, said first adder having a plurality of input circuits coupled to the plurality of output circuits of a first selected one of said plurality of delay lines, said first adder having an output circuit;

a second adder, said second adder having a plurality of input circuits coupled to the plurality of output circuits of a second selected one of said plurality of delay lines, said second adder having an output circuit;

a third adder, said third adder having a plurality of input circuits coupled to the plurality of output circuits of the remaining ones of said plurality of delay lines, said third adder having an output circuit;

a fourth adder, said fourth adder having a first input circuit coupled to the output circuit of said third adder and a second input circuit, said fourth adder having an output circuit coupled to a transmit device; and first switching means, said first switching means having: a first input circuit coupled to the output circuit of said first adder, a second input circuit coupled to the output circuit of said second adder, and an output circuit coupled to the transmit device, said first switching means being capable of alternately coupling said first and said second adder to said fourth adder.

7. The pulse sequencing system as defined in claim 6 wherein said plurality of series coupled tapped delay lines includes a further plurality of parallel output circuits and further comprising:

a fifth adder, said fifth adder having a plurality of input circuits coupled to the further plurality of output circuits of a first selected one of said plurality of delay lines, said fifth adder having an output circuit;

a sixth adder, said sixth adder having a plurality of input circuits coupled to the further plurality of output circuits of a second selected one of said plurality of delay lines, said sixth adder having an output circuit;

a seventh adder, said seventh adder having a plurality of input circuits coupled to the further plurality of output circuits of the remaining ones of said plurality delay lines, said seventh adder having an output circuit;

an eighth adder, said eighth adder having a first input circuit coupled to the output circuit of said seventh adder and a second input circuit, said eighth adder having an output circuit coupled to a transmit device; and second switching means, said second switching means having: a first input circuit coupled to the output circuit of said fifth adder, a second input circuit coupled to the output circuit of said sixth adder, and an output circuit coupled to the transmit device, said second switching means being capable of alternately coupling said fifth and said sixth adder to said eighth adder.

8. A pulse sequencing system comprising:

first delay means for receiving a first train of pulses and a second train of pulses, said means including a first plurality of parallel output means and a second plurality of parallel output means;

second delay means for receiving the first train of pulses and the second train of pulses, said means having a first plurality of parallel output means and a second plurality of parallel output means;

a first adder;

first switching means coupled to said first plurality of parallel output means of said first delay means and said first plurality of parallel outputs of said second delay means, said switching means being capable of applying said first train of pulses and said second train of pulses to said first adder in a first predetermined order and for applying said second train of pulses and said first train of pulses to said first adder in a second predetermined order;

a second adder; and second switching means coupled to said second plurality of parallel output means of said first delay means and to said second plurality of parallel output means of said second delay means and said switching means being capable of applying said first train of pulses and said second train of pulses to said second adder in the first predetermined order and of applying said second train of pulses and said first train of pulses to said second adder in the second predetermined order.

9. The pulse sequencing system as defined in claim 8 wherein said first and said second delay means comprises tapped delay lines.

10. A pulse compression code sequencing system for providing pulse codes to be coded and transmitted during a transmit mode of operation and received and decoded during a receive mode of operation in order to reduce sidelobes, comprising:

input means for receiving signal pulses to be coded for transmission and received codes to be decoded;

coding means coupled to said input means, said coding means having a coding section for developing first and second pulse codes from the signal pulses and a decoding section for decoding the received first and second pulse codes;

first switching means coupled to said input means and said coding means for alternately applying the signal pulses to the coding section and the received codes to the decoding section;

second switching means coupled to said coding means for alternately providing the first and second pulse codes to be transmitted; and means coupled to said decoding section for combining the decoded first and second pulse codes in order to reduce the sidelobes.

11. The pulse compression code sequencing system of claim 10 further including:

third switching means coupled to said decoding section for alternately providing the received first and second pulse codes to be decoded; and wherein said coding means comprises a plurality of series coupled tapped delay lines, a first plurality of adder means selectively coupled between said plurality of tapped delay lines and said second switching means for providing the first and second pulse codes whereby the second pulse code is a cyclic permutation of the first pulse code by a few bits, a second plurality of adder means selectively coupled between said plurality of tapped delay lines and said third switching means for providing the decoded first and second pulse codes.

12. The pulse compression code sequencing system of claim 10 wherein said coding means comprises:

a first adder in said coding section for providing the first and second pulse codes to be transmitted;

a second adder in said decoding section for providing the decoded first and second pulse codes;

first and second tapped delay lines selectively coupled to said first and second adders and being responsive to a first condition of said second switching means for sequentially applying a first train of pulses from said first tapped delay line and a second train of pulses from said second tapped delay line to said first adder in a first predetermined order and being further responsive to a second condition of said second switching means for sequentially applying the second train of pulses and the first train of pulses to said first adder in a second predetermined order for the subsequent transmission thereof, said first and second tapped delay lines being still further responsive to the first and second conditions of said second switching means during the receive mode of operation for alternately applying the first and second predetermined orders of the first and second trains of pulses to said second adder.

13. The pulse compression code sequencing system of claim 10 further including:

third switching means coupled to said decoding section for alternately providing the received first and second pulse codes to be decoded; and wherein said coding means comprises a tapped delay line, a first plurality of adder means selectively coupled between said tapped delay line and said second switching means for providing the first and second pulse codes, whereby the first and second pulse codes are each composed of odd and even numbered bits with the odd bits of the second code respectively corresponding in polarity to the odd bits of the first code and the even bits of the second code respectively having the opposite polarity from those of the first code, and a second plurality of adder means selectively coupled between said tapped delay line and said third switching means for providing the decoded first and second pulse codes.

* * * * *